United States Patent
Shiota et al.

(10) Patent No.: US 6,288,756 B1
(45) Date of Patent: *Sep. 11, 2001

(54) LUMINANCE CORRECTION CIRCUIT AND VIDEO DISPLAY MONITOR THEREOF

(75) Inventors: Tetsuro Shiota, Takatsuki; Hiroshi Miyai, Takarazuka, both of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/960,324

(22) Filed: Oct. 29, 1997

(30) Foreign Application Priority Data

Nov. 1, 1996 (JP) .................................... 8-291412

(51) Int. Cl.7 ......................................... H04N 9/77
(52) U.S. Cl. ................ 348/712; 348/536; 348/711; 348/655; 348/656; 348/657; 348/687
(58) Field of Search ..................... 348/712, 713, 348/708, 711, 645, 646, 647, 655, 656, 657, 658, 615, 616, 617, 686, 687, 536; H04N 9/77

(56) References Cited

U.S. PATENT DOCUMENTS

| | | | |
|---|---|---|---|
| 4,722,005 | * 1/1988 | Ledenbach | 384/173 |
| 4,788,601 | * 11/1988 | Kawasaki | 386/48 |
| 4,825,201 | 4/1989 | Watanabe et al. | 345/147 |
| 4,941,186 | * 7/1990 | Massmann et al. | 382/275 |
| 5,179,438 | * 1/1993 | Morimoto | 348/536 |
| 5,196,923 | * 3/1993 | Ueda et al. | 348/647 |
| 5,359,342 | 10/1994 | Nakai et al. | 345/89 |
| 5,359,366 | * 10/1994 | Ubukata et al. | 348/536 |
| 5,396,257 | * 3/1995 | Someya et al. | 345/1 |
| 5,546,134 | * 8/1996 | Lee | 348/673 |
| 5,838,396 | * 11/1998 | Shiota et al. | 348/745 |

FOREIGN PATENT DOCUMENTS

| | | |
|---|---|---|
| 0 462 333 | 12/1991 | (EP) . |
| 0 702 347 | 3/1996 | (EP) . |
| 61061569 | * 3/1986 | (JP) . |
| 61-243495 | 10/1986 | (JP) . |
| 6394782 | * 4/1988 | (JP) . |

* cited by examiner

Primary Examiner—Reinhard J. Eisenzopf
Assistant Examiner—Linus H. Lo
(74) Attorney, Agent, or Firm—Ratner & Prestia

(57) ABSTRACT

A luminance correction circuit to correct areas of unevenness in luminance or color of a video image and smoothes gaps between correction blocks. The luminance correction circuit comprises a memory for storing correction data for correcting unevenness in luminance or color of video image, a timing generator for controlling read timing of the correction data from the memory, and an analog processor for processing the video signal using the correction data from the memory. A display area is divided to an appropriate number of blocks and the video signal is corrected in each block and the boundary between corrected blocks is smoothed by controlling the correction timing.

14 Claims, 4 Drawing Sheets

LUMINANCE CORRECTION CIRCUIT AND VIDEO DISPLAY MONITOR THEREOF

FIELD OF THE INVENTION

The present invention relates to the field of luminance correction circuits for correcting unevenness in the luminance level and color of video images displayed on video display monitors.

BACKGROUND OF THE INVENTION

As projection display screens become larger, uneven luminance in each red, green, and blue color (hereafter referred to as R, G, B) and color impurity in the combinations of R, G, B occur because of i) deviation in the characteristics of the light source and video display elements, ii) light reduction at the periphery of the projection lens, and iii) projection angles subtending to the screen. Accordingly, the need has increased to incorporate circuits for correcting uneven luminance and color impurity. One example is disclosed in Japanese Laid-open Patent A61-243495.

An example of the prior art is explained with reference to FIG. 4.

The video signal input from a video signal input terminal 41 is converted to R, G, B video signals by a signal processor 48. An adder 49 adds a correction signal (described later) to the R, G, B video signals. After the correction signal is added, the R, G, B video signals pass through a drive circuit 50 and are output at video output terminal 51 to drive the video display element (not illustrated) thereby projecting the video image on the screen (not illustrated).

To generate the correction signal, the video signal with a specified amplitude is input to the video input terminal 41. A video image is expected to be displayed on the screen at a uniform luminance level by employing this video signal with a specified amplitude. However, because of the aforementioned reasons, the luminance level on the screen may not be uniform in some cases.

Correction data for maintaining a uniform luminance level on the screen is therefore created as follows.

A projection screen is divided into squares. The luminance level of the video image in each divided square on the screen is measured using a video camera. The difference between the measured luminance level and a specified luminance level is stored in a memory 46 as correction data for each divided area.

The video signal input to the video signal input terminal 41 is also input to a synchronizing separator 42. The synchronizing separator 42 outputs a horizontal synchronizing signal H and a vertical synchronizing signal V. The horizontal synchronizing signal H is input to a phase synchronizing circuit 43. The phase synchronizing circuit 43 produces a horizontal synchronizing clock signal CLK in accordance with the horizontal synchronizing signal H to an address counter 45. At the same time, the synchronizing separator 42 also outputs the vertical synchronizing signal V to the address counter 45.

In practical operation, for reading the correction data previously stored in the memory 46, the horizontal synchronizing clock signal CLK and the vertical synchronizing signal V control the address counter 45 for calculating an address in the memory 46 corresponding to each divided area made at creating the correction data.

A D/A converter 47 converts the correction data read from the memory 46 into an analog correction signal. This analog correction signal is input to the adder 49.

As mentioned above, unevenness in the luminance or color of the video image displayed on the screen is corrected by adding the correction signal to the input video signal at the adder 49 and driving the video display element through the driver 50.

However, since unevenness of the luminance or color of the video image is corrected for each divided area, a gap in correction between the correction data for each area may be obvious.

The gap in horizontal direction can be smoothed relatively easily by the use of a low pass filter. However, for smoothing the gap in vertical direction, an expensive circuit such as a field memory may be required. Consequently, smoothing in the vertical direction is not always easy in the prior art.

SUMMARY OF THE INVENTION

The present invention offers a highly accurate and inexpensive way of smoothing the gap between each area in both horizontal and vertical directions when unevenness of the video image displayed is corrected for each divided area. A video display monitor of the present invention comprises a correction data generator for generating correction data to correct unevenness in the luminance or color of the video image in at least one of the R, G, B primary colors of the video signal, a timing generator for controlling the timing to read out the correction data from the correction data generator, and a processor for correcting the video signal based on the correction data output from the correction data generator. The timing generator shifts an area to apply correction to the video signal using the correction data by controlling the timing to output the correction data from the correction data generator so that the boundary between correction blocks can be smoothed.

DETAILED DESCRIPTION

An exemplary embodiment of the present invention is explained with reference to FIGS. 1, 2A, 2B, 3A, and 3B.

Figure 1:
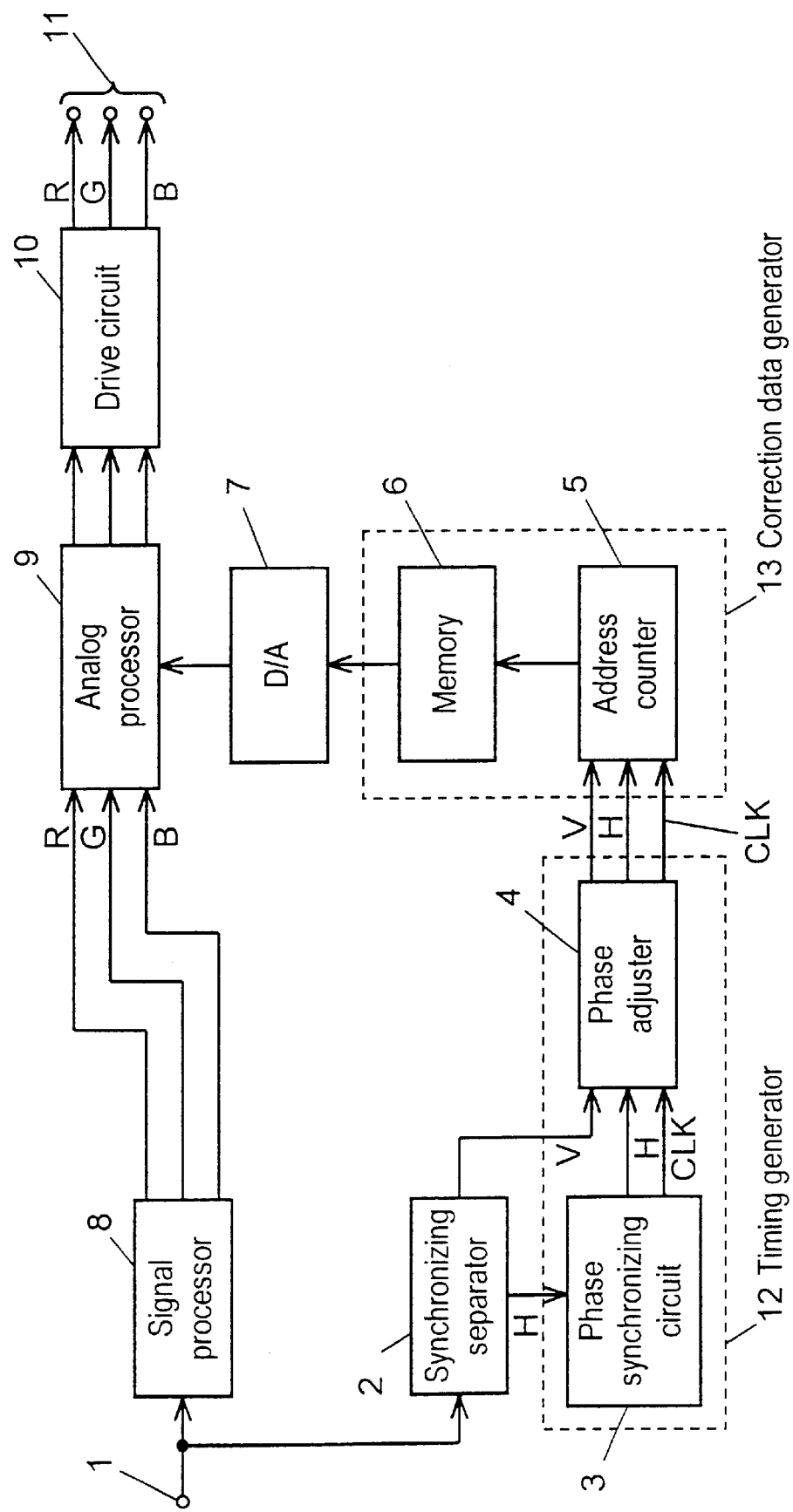
FIG. 1 is a block diagram of a luminance correction circuit in accordance with an exemplary embodiment of the present invention.

FIG. 1 is a block diagram of a luminance correction circuit in an exemplary embodiment of the present invention. The video signal input from a video input terminal 1 is converted to R, G, B video signals by a signal processor 8.

An analog processor 9 calculates the R, G, B output video signals from the signal processor 8 using a correction signal (described later), and a corrected video signal is output. The corrected video signal passes through a drive circuit 10 to drive the video display element (not illustrated) for projecting the video image on the screen (not illustrated). In the calculation of the analog processor 9, for example, the correction signal is added to the video signal. In other examples, a correction coefficient is multiplied, divided, or multiplied and added., To generate the correction signal, a video signal with a specified amplitude is input to the video input terminal 1. A video image is expected to be displayed at a uniform luminance level by employing this video signal with a specified amplitude. However, because of the range of aforementioned reasons such as deviation in the characteristics of the light source and video display element, the luminance level on the screen may not be uniform. Correction data for maintaning a =uniform luminance level on the screen is therefore created as follows.

First, the display screen is divided into squares. The luminance level of the video image in each divided area on the screen is measured using the video camera. The difference between the measured lumance level and a specified luminance level is stored in a memory 6 as luminance correction data for each divided area. In other cases, the correction coefficient may be calculated from the difference and stored in the memory 6 as the correction data.

The video signal input to the video signal input terminal 1 is also input to a synchronizing separator 2. The synchronizing separator 2 outputs a horizontal synchronizing signal H and a vertical synchronizing signal V, and the horizontal synchronizing signal H is input to a phase synchronizing circuit 3. The phase synchronizing circuit 3 produces a horizontal synchronizing clock signal CLK in accordance with the horizontal synchronizing signal H. The horizontal synchronizing signal H and the horizontal synchronizing clock signal CLK are input to a phase adjuster 4. The vertical synchronizing signal V output from the synchronizing separator 2 is also input to the phase adjuster 4.

The phase adjuster 4 receives the horizontal synchronizing clock signal CLK, the vertical synchronizing signal V, and the horizontal synchronizing signal H, and controls the phase of the horizontal synchronizing signal H and the vertical synchronizing signal V for each field. An address counter 5 receives the output signal from the phase adjuster 4. The signal input to the address counter 5 are equivalent to the display position information of a video display monitor. The address counter 5 generates an address corresponding to the correction data for each area of the projection screen divided into squares.

In other words, the correction data for each R, G, B signal corresponding to each divided area is read out by inputting an address corresponding to each divided area to the memory 6 using a timing generator 12 consisting of the bye phase synchronizing circuit 3 and the phase adjuster 4. The address counter 5 and the memory 6 form a correction data generator 13.

A D/A converter 7 then converts the correction data which is used as the correction signal for each R, G, B signal, and outputs the correction data to the analog processor 9. This signal operates on at least one of the R, G, B primary colors of the video signal output from the signal processor 8 for improving uniformity. The corrected video signal is input to a drive circuit 10, and then output from the video output terminal 11.

FIGS. 2A, 2B, 3A, and 3B show the concept and a tining chart for explaining the operation of the phase adjuster which smoothes the correction gap between correction blocks (an area on the screen corrected using the same correction data) by controlling the vertical synchronizing signal V and the horizontal synchronizing signal H.

Figure 2A:
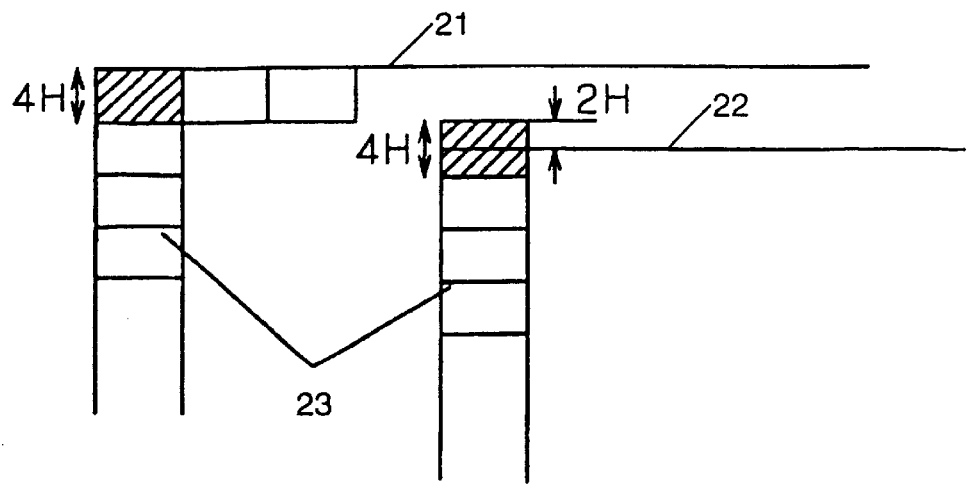
FIGS. 2A and 2B are conception illustrating phase adjustment of the synchronizing signal.

FIG. 2A shows a display area in a first exemplary embodiment. The display screen is divided into 120 areas in the vertical direction, and correction data is created for each of these divided areas. (he screen is also divided into appropriate numbers in the horizontal direction.) FIG. 2A shows the case when the number of horizontal lines in each divided area is 4H lines. In an even field 21, a correction block 23 which is an area to be corrected using the same correction data, conforms to an area for which the correction data is created. In other words, position of a correction block is the same as a display area in even fields. In an odd field 22, however, the correction block 23 shifts for 2H lines from an area for which the correction data is created, as shown in FIG. 2A, by advancing the vertical position of the correction block 23 by 2H lines. In other words, position of a correction block shifts from a display area for 2H lines by advancing the vertical synchronizing signal of the correction block by 2H lines compared to the video signal in odd fields. This enables a change in the boundary position of the correction block in the even field 21 and the odd field 22, thereby preventing a noticeable boundary appearing between correction blocks due to a gap in the data.

Figure 3A:
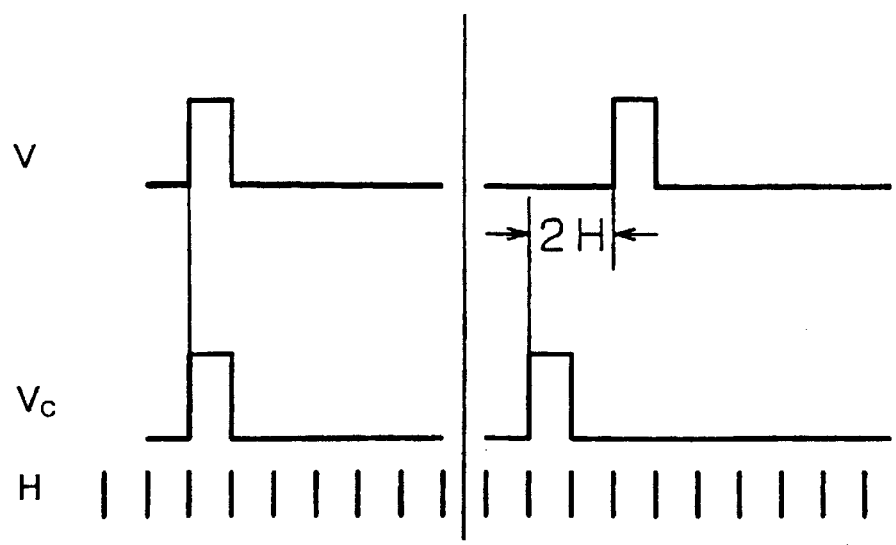
FIGS. 3A and 3B are timing charts illustrating phase adjustment of the synchronizing signal.

FIG. 3A shows the timing of the vertical synchronizing signal V of the video signal and the vertical synchronizing signal Vc of the correction data corresponding to FIG. 2A. The left portion of FIG. 3A shows the even field 21 and the right of FIG. 3A shows the odd field 22. The vertical synchronizing signal of the correction data for the odd field 22 is advanced by 2H lines.

Figure 2B:
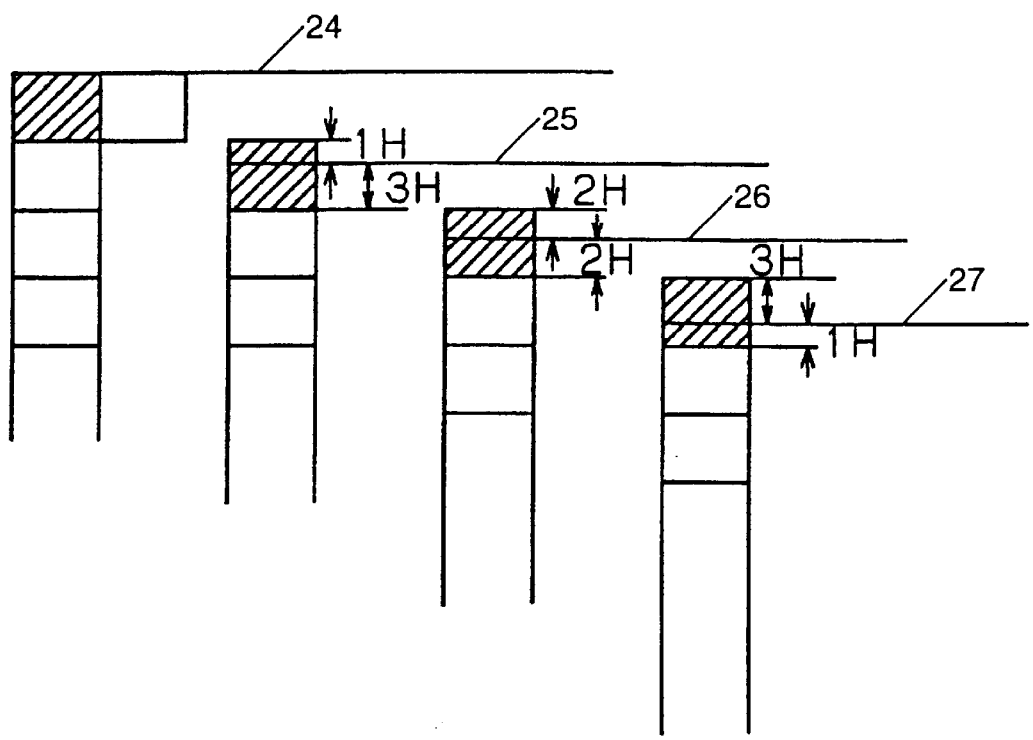

FIG. 2B shows another exemplary embodiment of the present invention.

The vertical synchronizing signal is shifted by 1H each over four fields between the fields 24 and 27. This reduces the noticeable boundary even more than the first exemplary embodiment shown in FIG. 2A.

Figure 3B:
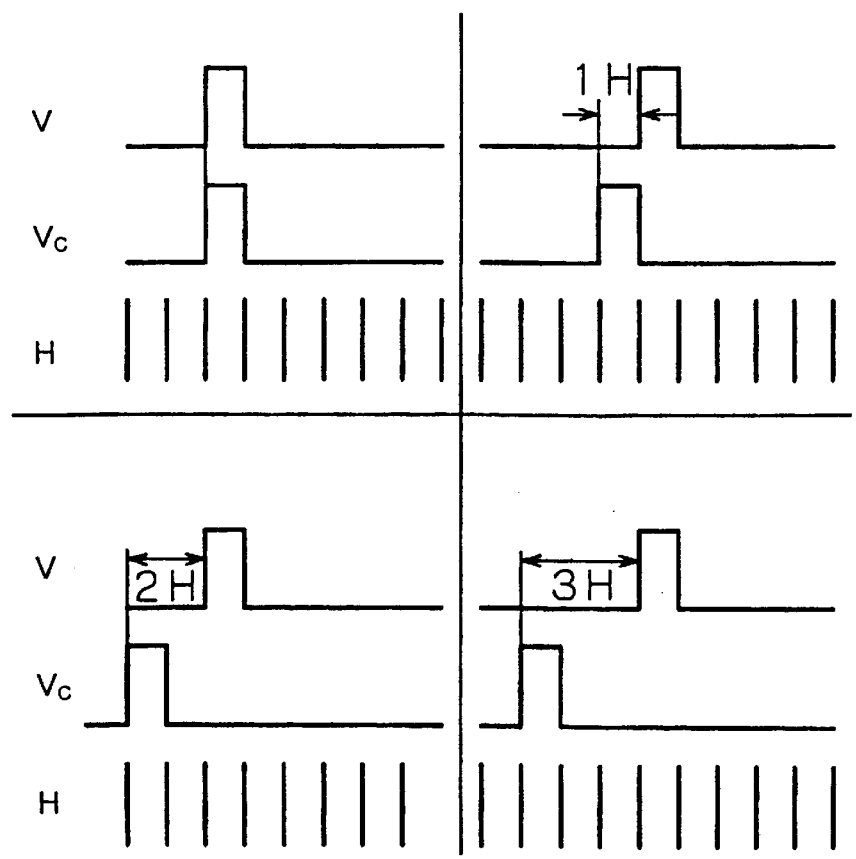
Figure 4:
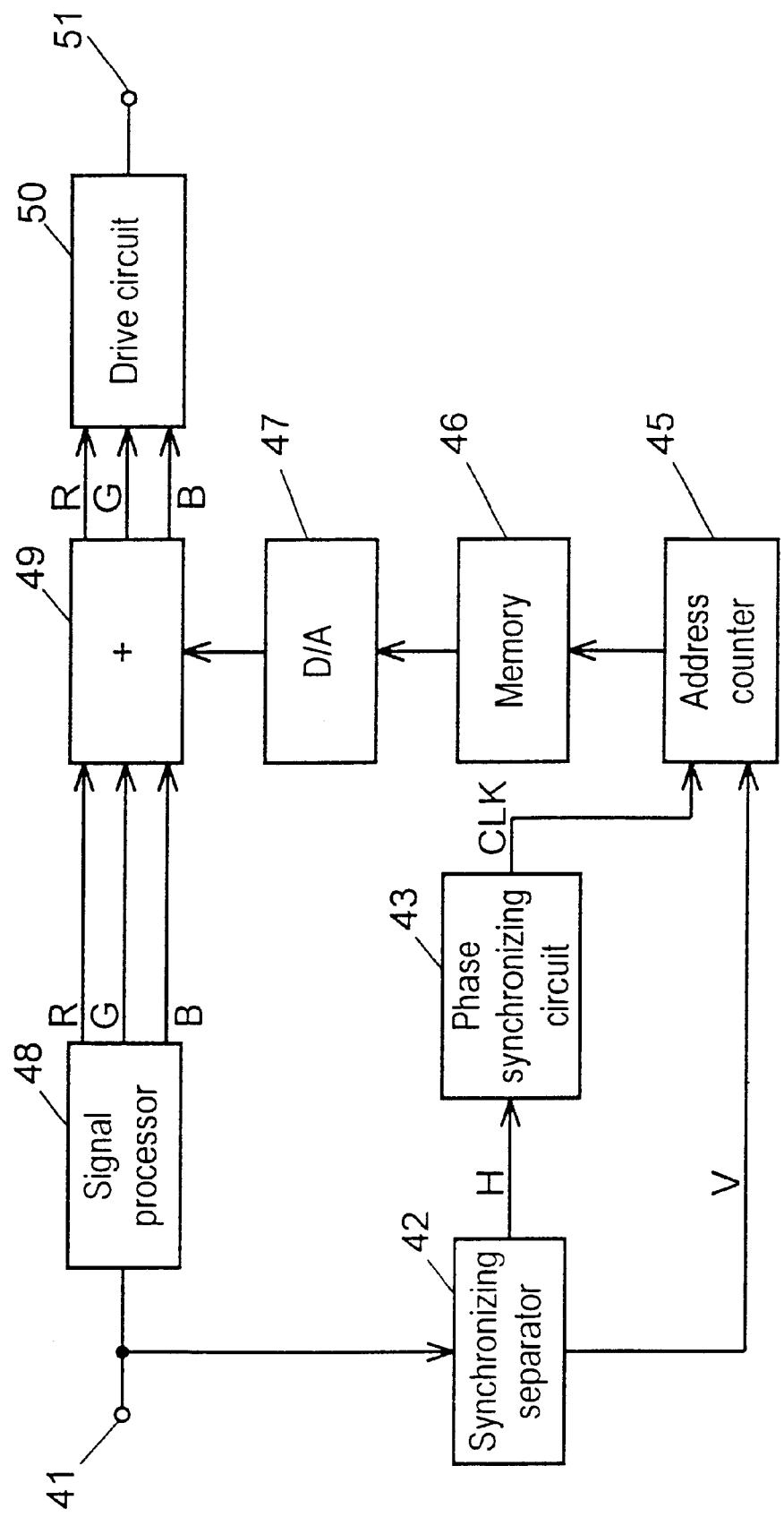
FIG. 4 is a block diagram of a luminance correction circuit of the prior art.

FIG. 3B shows the timing of the vertical synchronizing signal V of the video signal and the vertical synchronizing signal Vc of the correction data in four fields between 24 and 27 corresponding to FIG. 2B. It shows shifted timing of the correction data for each field such as the first field is the upper left of FIG. 3B, the second field is the upper right of FIG. 3, the third field is the lower left of FIG. 3B, the fourth field is the lower right of FIG. 3B, the fifth field is the upper left of FIG. 3B, the sixth field is the upper right of FIG. 3B, and so on. The vertical synchronizing signal of the correction data is advanced by 1H line each in each field.

The above explains the case of smoothing in the vertical direction. Smoothing of the boundary of correction blocks is also possible in the horizontal direction by the use of the same control.

As described above, the luminance correction circuit of the present invention and its application in a video display monitor provide an inexpensive way to correct the video signal in each divided area and smooth the boundary between correction blocks with high accuracy by controlling the dining of the horizontal synchronizing signal and the vertical synchronizing signal for correction such as by shifting the phase in each field.

In the exemplary embodiment, the address counter and the memory are employed for generating the correction data. The same effect is also obtainable by replacing this part with other data generators. The exemplary embodiments described herein are illustrative and not restrictive, the scope of the invention being indicated by the appended claims and all variations which come within the meaning of the claim are intended to be embraced therein.

What is claimed is:

1. A luminance correction circuit for use with a video signal corresponding to a video image, said luminance correction circuit comprising:
   means for dividing a display screen into a plurality of areas;
   a correction data generator for generating correction data in each of said areas for correcting at least one of luminance and color level of the video image;

a timing generator for generating a timing signal for shifting a timing in each field, by shifting the timing of the correction data to read the correction data in each of said areas from said correction data generator; and a processor for correcting said video image using the correction data from said correction data generator.

2. A luminance correction circuit as defined in claim 1, wherein said timing generator controls the timing of the correction data from said correction data generator by shifting a phase of at least one of a vertical synchronizing signal and a horizontal synchronizing signal of said video signal.

3. A video display monitor for displaying a video signal corresponding to a video image, said video display monitor comprising:

a luminance correction circuit including;

means for dividing a display screen into a plurality of areas:

a correction data generator for generating correction data for correcting at least one of luminance and color level of the video image in each of said areas;

a timing generator for generating a timing signal for shifting a timing in each field by shifting the timing of the correction data to read the correction data in each of said areas from said correction data generator; and a processor for correcting said video image using the correction data from said correction data generator, wherein said video display monitor displays said video image output from said luminance correction circuit.

4. A video display monitor according to claim 3, wherein said timing generator controls the timing of the correction data from said correction data generator by shifting a phase of at least one of a vertical synchronizing signal and a horizontal synchronizing signal of said video signal.

5. A luminance correction circuit as defined in claim 1, wherein the luminance corrected is an uneven luminance and the color level of the video image includes at least one of i) a red, ii) a green, and iii) a blue color component.

6. A luminance correction circuit as defined in claim 1, further comprising a phase adjuster for providing to said correction data i) a first phase for correcting an even field of the video signal and ii) a second phase different from said first phase for correcting an odd field of said video signal.

7. A luminance correction circuit as defined in claim 3, wherein the luminance corrected is an uneven luminance and the color level of the video image includes at least one of i) a red, ii) a green, and iii) a blue color component.

8. A luminance correction circuit as defined in claim 3, further comprising a phase adjuster for providing to said correction data i) a first phase for correcting an even field of the video signal and ii) a second phase different from said first phase for correcting an odd field of said video signal.

9. A luminance correction circuit for use with a video signal corresponding to a video image, said luminance correction circuit comprising:

means for dividing a display screen into a plurality of areas:

a correction data generator for generating correction data in each of said areas for correcting at least one of luminance and color level of the video image;

a timing generator for generating a timing signal for shifting a timing of at least one of a vertical synchronizing signal and a horizontal synchronizing signal in each field to read the correction data in each of said areas from said correction data generator; and a processor for correcting said video image using the correction data from said correction data generator based on the timing signal from said timing generator.

10. A video display monitor for displaying a video signal corresponding to a video image, said video display monitor comprising:

a luminance correction circuit including;

means for dividing a display screen into a plurality areas;

a correction data generator for generating correction data for correcting at least one of luminance and color level of the video image in each of said areas;

a timing generator for generating a timing signal for shifting a timing of at least one of a vertical synchronizing signal and a horizontal synchronizing signal in each field to read the correction data in each of said areas from said correction data generator; and a processor for correcting said video image using the correction data from said correction data generator based on the timing signal from said timing generator, wherein said video display monitor displays said video image output from said luminance correction circuit.

11. A luminance correction circuit as defined in claim 9, wherein the luminance corrected is an uneven luminance and the color level of the video image includes at least one of i) a red, ii) a green, and iii) a blue color component.

12. A luminance correction circuit as defined in claim 9, wherein said timing generator further comprising:

a phase adjuster for providing, in order to read the correction data from said correction data generator in each of said areas, i) a first timing signal of at least one of a vertical synchronizing signal and a horizontal synchronizing signal in an even field and ii) a second signal shifted from said first signal in an odd field;

wherein said luminance correction circuit outputs the correction data generated from said correction data generator in each of said areas based on the timing signal provided from said phase adjuster in each field.

13. A video display monitor as defined in claim 10, wherein the luminance corrected is an uneven luminance and the color level of the video image includes at least one of i) a red, ii) a green, and ii)) a blue color component.

14. A video display monitor as defined in claim 10, wherein said timing generator further comprising:

a phase adjuster for providing, in order to read the correction data from said correction data generator in each of said areas, i) a first timing signal of at least one of a vertical synchronizing signal and a horizontal synchronizing signal in an even field and ii) a second signal shifted from said first signal in an odd field;

wherein said luminance correction circuit outputs the correction data generated from said correction data generator in each of said areas based on the timing signal provided from said phase adjuster in each field.

* * * * *

UNITED STATES PATENT AND TRADEMARK OFFICE
CERTIFICATE OF CORRECTION

PATENT NO.    : 6,288,756 B1
DATED         : September 11, 2001
INVENTOR(S)   : Testsuro Shiota and Hiroshi Miyai It is certified that error appears in the above-identified patent and that said Letters Patent is hereby corrected as shown below:

<u>Title page,</u>
Item [56], References Cited, insert -- U.S. Patent Number 5,430,502, dated 7/1995, Yamazaski et al. --

<u>Column 6,</u>
Line 48, delete "ii))" and insert -- iii) --

Signed and Sealed this

Twenty-fourth Day of December, 2002

JAMES E. ROGAN
*Director of the United States Patent and Trademark Office*